(12) United States Patent
Kwak et al.

(10) Patent No.: US 12,243,243 B2
(45) Date of Patent: Mar. 4, 2025

(54) METHOD AND APPARATUS WITH SCENE FLOW ESTIMATION

(71) Applicants: SAMSUNG ELECTRONICS CO., LTD., Suwon-si (KR); Korea Advanced Institute of Science and Technology, Daejeon (KR)

(72) Inventors: Youngjun Kwak, Seoul (KR); Taekyung Kim, Daejeon (KR); Changick Kim, Daejeon (KR); Byeongjun Park, Daejeon (KR); Changbeom Park, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 387 days.

(21) Appl. No.: 17/668,513

(22) Filed: Feb. 10, 2022

(65) Prior Publication Data

US 2022/0301190 A1 Sep. 22, 2022

(30) Foreign Application Priority Data

Mar. 17, 2021 (KR) .................. 10-2021-0034424
May 4, 2021 (KR) .................. 10-2021-0058065

(51) Int. Cl.
*G06T 7/246* (2017.01)
*G06T 3/18* (2024.01)
(Continued)

(52) U.S. Cl.
CPC .............. *G06T 7/248* (2017.01); *G06T 3/18* (2024.01); *G06T 3/4007* (2013.01); *G06T 7/55* (2017.01);
(Continued)

(58) Field of Classification Search
CPC ......... G06T 7/248; G06T 3/18; G06T 3/4007; G06T 7/55; G06T 2207/10016;
(Continued)

(56) References Cited

U.S. PATENT DOCUMENTS 9,904,855 B2   2/2018 Chandraker et al.
11,948,310 B2 * 4/2024 Guizilini ............... G06T 7/579
(Continued)

FOREIGN PATENT DOCUMENTS

KR   10-0656334 B1   12/2006
KR   10-1026585 B1    4/2011
(Continued)

OTHER PUBLICATIONS

J. -R. Chang and Y. -S. Chen, "Pyramid Stereo Matching Network," 2018 IEEE/CVF Conference on Computer Vision and Pattern Recognition, Salt Lake City, UT, USA, 2018, pp. 5410-5418, doi: 10.1109/CVPR.2018.00567. (Year: 2018).*
(Continued)

*Primary Examiner* — Tom Y Lu
*Assistant Examiner* — Andrew B. Jones
(74) *Attorney, Agent, or Firm* — NSIP Law (57) ABSTRACT

A scene flow estimation method and apparatus are provided. The scene flow estimation method includes receiving a first feature pyramid and a second feature pyramid by encoding a first frame and a second frame of an input image through the same encoder, extracting a depth feature based on the first feature pyramid, extracting a motion feature based on the first feature pyramid and the second feature pyramid, generating an overall feature based on the depth feature and the motion feature, and estimating a scene flow based on the overall feature.

16 Claims, 5 Drawing Sheets

(51) Int. Cl.
  *G06T 3/4007* (2024.01)
  *G06T 7/55* (2017.01)
  *G06V 20/40* (2022.01)
(52) U.S. Cl.
  CPC .... *G06V 20/46* (2022.01); *G06T 2207/10016* (2013.01)
(58) Field of Classification Search
  CPC . G06T 2207/10021; G06T 2207/20084; G06T 2207/30252; G06T 7/246; G06T 7/269; G06T 7/593; G06V 20/46; G06V 10/82
  See application file for complete search history.

(56) References Cited

U.S. PATENT DOCUMENTS

| | | | |
|---|---|---|---|
| 2019/0050998 | A1 | 2/2019 | Kirby |
| 2019/0057509 | A1 | 2/2019 | Lv et al. |
| 2020/0084427 | A1* | 3/2020 | Sun .................. G06N 3/045 |
| 2020/0160537 | A1 | 5/2020 | Urtasun et al. |
| 2020/0211206 | A1 | 7/2020 | Wang et al. |

FOREIGN PATENT DOCUMENTS

| | | |
|---|---|---|
| KR | 10-1629414 B1 | 6/2016 |
| KR | 10-1961687 B1 | 3/2019 |
| KR | 10-2034024 | 10/2019 |
| KR | 10-2020-0016627 A | 2/2020 |

OTHER PUBLICATIONS

Min, Zhixiang, et al. "Voldor: Visual odometry from log-logistic dense optical flow residuals." Proceedings of the IEEE/CVF Conference on Computer Vision and Pattern Recognition. 2020 (pp. 4898-4909 in English language).

Cao, Zhe, et al. "Learning independent object motion from unlabelled stereoscopic videos." Proceedings of the IEEE/CVF Conference on Computer Vision and Pattern Recognition. 2019 (pp. 5594-5603 in English language).

Hur, Junhwa, et al.. "Self-supervised monocular scene flow estimation." Proceedings of the IEEE/CVF Conference on Computer Vision and Pattern Recognition. 2020 (pp. 7396-7405 in English language).

Brickwedde, Fabian et al. "Mono-sf: Multi-view geometry meets single-view depth for monocular scene flow estimation of dynamic traffic scenes." Proceedings of the IEEE/CVF International Conference on Computer Vision. 2019 (pp. 2780-2790 in English language).

Behl, Aseem, et al. "Bounding boxes, segmentations and object coordinates: How important is recognition for 3d scene flow estimation in autonomous driving scenarios?." Proceedings of the IEEE International Conference on Computer Vision. 2017 (pp. 2574-2583 in English language).

Sun, Deqing, et al. "Pwc-net: Cnns for optical flow using pyramid, warping, and cost volume." Proceedings of the IEEE conference on computer vision and pattern recognition. 2018 (pp. 8934-8943 in English language).

Schuster, René et al. "MonoComb: A Sparse-to-Dense Combination Approach for Monocular Scene Flow." Computer Science in Cars Symposium. arXiv:2010.10842v2 [cs.CV] Nov. 12, 2020 pgs. (1-8 in English language).

Yang, Gengshan et al. "Upgrading optical flow to 3d scene flow through optical expansion." Proceedings of the IEEE/CVF Conference on Computer Vision and Pattern Recognition. 2020 (pp. 1334-1343 in English language)).

Dijk, Tom van et al. "How do neural networks see depth in single images?. " Proceedings of the IEEE/CVF International Conference on Computer Vision. 2019 (pp. 2183-2191 in English language).

Jiang, Huaizu, et al. "Sense: A shared encoder network for scene-flow estimation." Proceedings of the IEEE/CVF International Conference on Computer Vision. 2019 (pp. 3195-3204 in English language).

* cited by examiner

METHOD AND APPARATUS WITH SCENE FLOW ESTIMATION

CROSS-REFERENCE TO RELATED APPLICATIONS

This application claims the benefit under 35 USC § 119(a) of Korean Patent Application No. 10-2021-0034424 filed on Mar. 17, 2021, and Korean Patent Application No. 10-2021-0058065 filed on May 4, 2021, in the Korean Intellectual Property Office, the entire disclosures of which are incorporated herein by reference for all purposes.

BACKGROUND

1. Field

The following description relates to a scene flow estimation method and apparatus.

2. Description of Related Art

For scene flow estimation, a method of expanding a two-dimensional (2D) optical flow to a three-dimensional (3D) scene flow by simultaneously estimating an optical flow and a depth is typically implemented. In an example, a 3D scene flow may be estimated using an optical flow and a depth based on multi-view geometry by implementing a Bayesian neural network (BNN) to learn a depth based on a semi-global matching (SGM) algorithm to estimate a dense depth map from a stereo image pair in order to reduce depth uncertainty that may occur when estimating a monocular scene flow, and by estimating an accurate depth by a monocular camera.

Recently, a monocular depth estimation method based on self-supervised learning has emerged amid the advancement of a deep neural network (DNN), and thus self-supervised learning is applied to estimate a monocular scene flow.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented scene flow estimation method includes receiving a first feature pyramid and a second feature pyramid by encoding a first frame and a second frame of an input image through a same encoder; extracting a depth feature based on the received first feature pyramid; extracting a motion feature based on the received first feature pyramid and the received second feature pyramid; generating an overall feature based on the depth feature and the motion feature; and estimating a scene flow based on the overall feature.

The method may include estimating a depth of the input image based on the depth feature; and estimating an optical flow of the input image based on the motion feature.

The extracting of the depth feature may include performing decoding on a first level and a second level of the first feature pyramid; and performing decoding on a third level of the second feature pyramid based on a result of the decoding.

The performing of the decoding on the first level and the decoding on the second level may include performing a first convolution operation on the first level; upsampling a result of the first convolution operation, and concatenating a result of the upsampling and the second level; and performing a second convolution operation on a result of the concatenating.

The performing of the decoding on the third level may include concatenating the result of the decoding on the third level and a result of a previous scene flow estimation and performing the first convolution operation on a result of the concatenating; upsampling a result of the first convolution operation and concatenating a result of the upsampling and the third level; performing the second convolution operation on a result of the concatenating; and concatenating a result of the second convolution operation and the overall feature and performing a third convolution operation on a result of the concatenating.

The extracting of the motion feature may include inputting a first level of the second feature pyramid to a warping layer; inputting an output of the warping layer and a first level of the first feature pyramid to a correlation layer; and concatenating an output of the correlation layer and the first level of the first feature pyramid and inputting a result of the concatenating to a correlation regularization module configured to perform a plurality of convolution operations.

The warping layer may be configured to adjust a position of each pixel of the first level of the second feature pyramid based on a result of a previous optical flow estimation performed based on the motion feature, and a result of a previous scene flow estimation performed based on the overall feature.

The correlation layer may be configured to calculate a correlation of each pixel of the first level of the first feature pyramid with the output of the warping layer.

The generating of the overall feature may include performing a nearest-neighbor interpolation (NNI) on the depth feature and concatenating a result of the NNI and the motion feature; performing a convolution operation based on a concatenated feature obtained by the concatenating and extracting a spatial feature; performing a global average pooling (GAP) operation on the concatenated feature and extracting a channel feature; and obtaining the overall feature based on the spatial feature, the channel feature, and the motion feature.

In a general aspect, a scene flow estimation apparatus includes one or more processors configured to: receive a first feature pyramid and a second feature pyramid by encoding a first frame and a second frame of an input image through a same encoder; extract a depth feature based on the received first feature pyramid; extract a motion feature based on the received first feature pyramid and the received second feature pyramid; generate an overall feature based on the depth feature and the motion feature; and estimate a scene flow based on the overall feature.

The one or more processors are further configured to: estimate a depth of the input image based on the depth feature; and estimate an optical flow of the input image based on the motion feature.

The one or more processors are further configured to: perform decoding on a first level and a second level of the first feature pyramid; and perform decoding on a third level of the second feature pyramid based on a result of the decoding.

The one or more processors are further configured to: perform a first convolution operation on the first level; upsample a result of the first convolution operation and concatenate a result of the upsampling and the second level; and perform a second convolution operation on a result of the concatenating.

The one or more processors are further configured to: concatenate the result of the decoding and a result of a previous scene flow estimation and perform the first convolution operation on a result of the concatenating; upsample a result of the first convolution operation and concatenate a result of the upsampling and the third level; perform the second convolution operation on a result of the concatenating; and concatenate a result of the second convolution operation and the overall feature and perform a third convolution operation on a result of the concatenating.

The one or more processors are further configured to: input a first level of the second feature pyramid to a warping layer; input an output of the warping layer and a first level of the first feature pyramid to a correlation layer; and concatenate an output of the correlation layer and the first level of the first feature pyramid, and input a result of the concatenating to a correlation regularization module configured to perform a plurality of convolution operations.

The warping layer may be configured to adjust a position of each pixel of the first level of the second feature pyramid based on a result of a previous optical flow estimation performed based on the motion feature and a result of a previous scene flow estimation performed based on the overall feature.

The correlation layer may be configured to calculate a correlation of each pixel of the first level of the first feature pyramid with the output of the warping layer.

The one or more processors are further configured to: perform a nearest-neighbor interpolation (NNI) on the depth feature and concatenate a result of the NNI and the motion feature; perform a convolution operation based on a concatenated feature obtained by the concatenating and extract a spatial feature; perform a global average pooling (GAP) operation on the concatenated feature and extract a channel feature; and obtain the overall feature based on the spatial feature, the channel feature, and the motion feature.

The apparatus may further include a memory storing instructions that, when executed by the one or more processors, configure the one or more processors to perform the receiving of the first feature pyramid and the second feature pyramid, the extracting of the depth feature, the extracting of the motion feature, the generating of the overall feature, and the estimating of the scene flow.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

Figure 1:
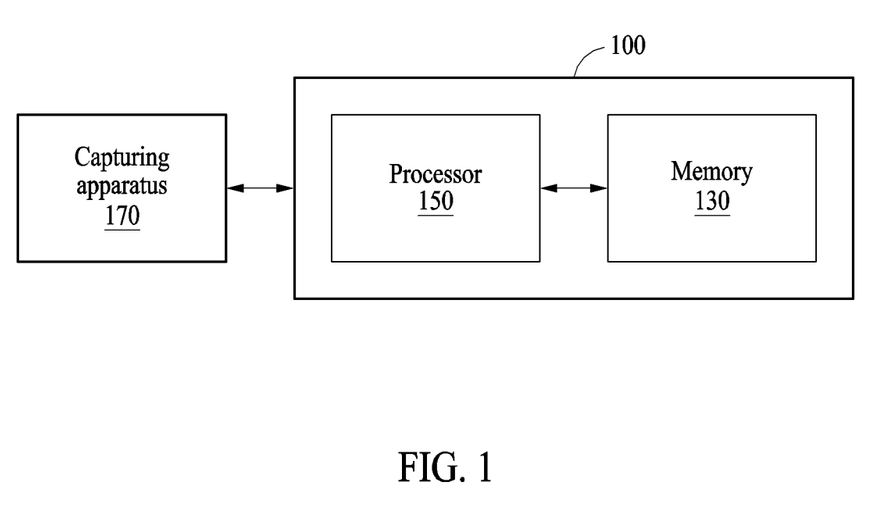
FIG. 1 illustrates an example of a scene flow estimation system, in accordance with one or more embodiments.

FIG. 1 illustrates an example of a scene flow estimation system, in accordance with one or more embodiments.

The scene flow estimation system may include a capturing apparatus 170 and a scene flow estimation apparatus 100. The scene flow estimation apparatus 100 may estimate a scene flow of an image captured through the capturing apparatus 170.

The scene flow estimation apparatus 100 may estimate a scene flow based on a deep learning-based inference. The scene flow estimation apparatus 100 may obtain a result of estimating a scene flow by inputting an input image to a neural network.

The scene flow estimation apparatus 100 may estimate a scene flow based on a monocular image. In an example, the capturing apparatus 170 may capture consecutive monocular images, and the scene flow estimation apparatus 100 may estimate a scene flow based on the captured monocular images.

The scene flow estimation apparatus 100 may estimate a scene flow based on a single encoder. In an example, the scene flow estimation apparatus 100 may generate an input of a network that extracts a depth feature and an input of a network that extracts a motion feature through the same encoder.

The scene flow estimation apparatus 100 may include a memory 130 and a processor 150.

The memory 130 may store instructions (or programs) executable by the processor 150. In an example, the instructions may include instructions to execute an operation of the processor 150 and/or instructions to perform an operation of each component of the processor 150. The memory 130 may be implemented in a volatile or non-volatile memory device.

The volatile memory device may be implemented as a dynamic random-access memory (DRAM), a static RAM (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Furthermore, the memory 130 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The memory 130 may store a matrix on which an operation included in the neural network is to be performed. The memory 130 may store a result generated by processing the operation by the processor 150.

The processor 150 may process data stored in the memory 130. The processor 150 may execute a computer-readable code (e.g., software) stored in the memory 130 and instructions induced by the processor 150.

The processor 150 may be a hardware-implemented data processing device having a physically structured circuit for executing desired operations. For example, the desired operations may include instructions or a code in a program.

In an example, the hardware-implemented data processing device may include a central processing unit (CPU), a graphics processing unit (GPU), a neural processing unit (NPU), a multi-core processor, a multiprocessor, an application-specific integrated circuit (ASIC), and a field-programmable gate array (FPGA).

A scene flow estimating operation of the scene flow estimation apparatus 100 to be described hereinafter with reference to FIGS. 2 through 4 may be construed as an operation processed by the processor 150.

Figure 2:
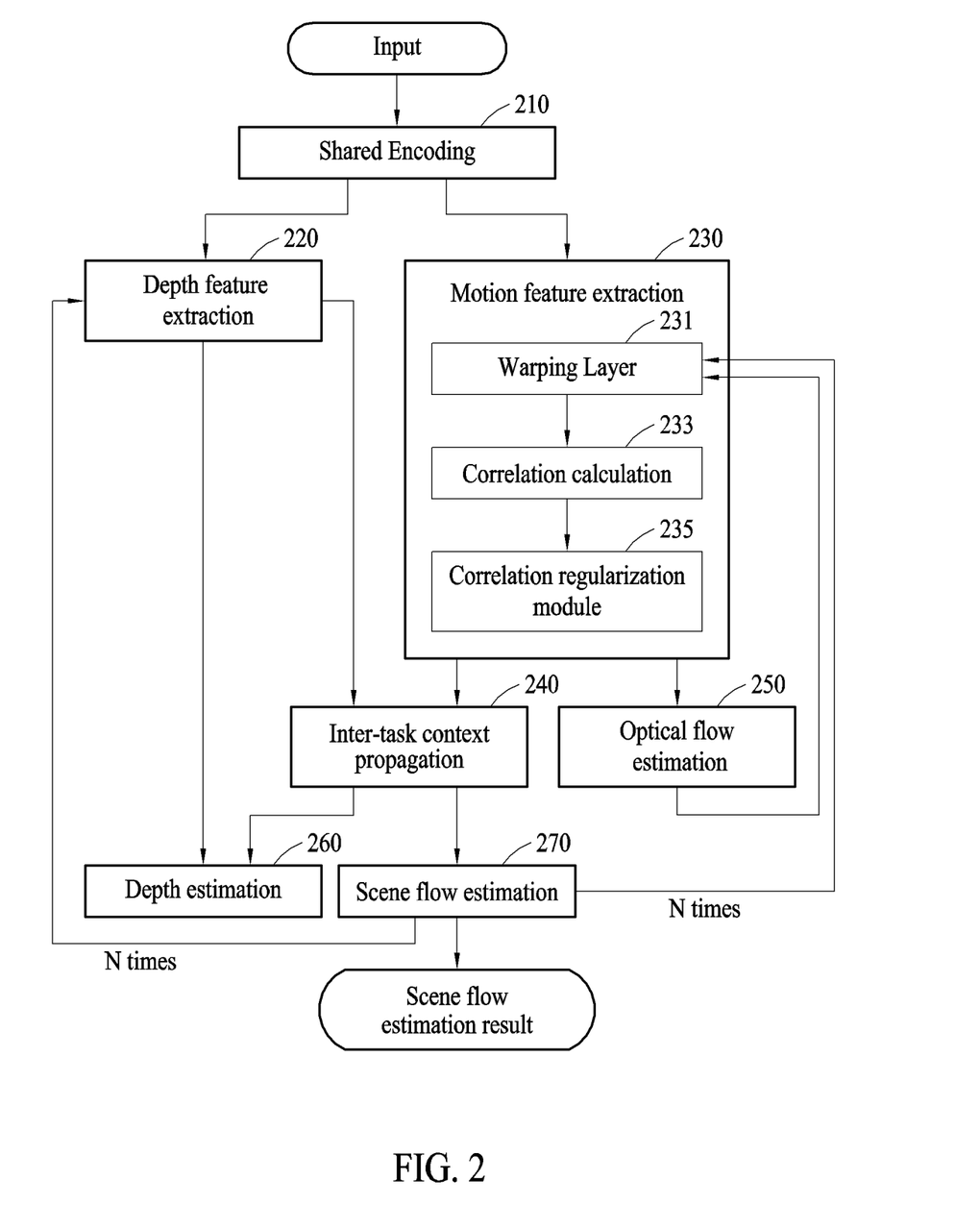
FIG. 2 illustrates an example of an operation of an example scene flow estimation apparatus illustrated in FIG. 1.

FIG. 2 illustrates an example of an operation of the example scene flow estimation apparatus 100 illustrated in FIG. 1.

In operation 210, the scene flow estimation apparatus 100 may encode an input image. The scene flow estimation apparatus 100 may generate two different feature pyramids by encoding two different frames of the input image through the same encoder.

In operation 220, the scene flow estimation apparatus 100 may extract a depth feature based on a feature pyramid. In operation 230, the scene flow estimation apparatus 100 may extract a motion feature based on the feature pyramids.

In operation 240, the scene flow estimation apparatus 100 may perform an inter-task context propagation on the depth feature and the motion feature. That is, the scene flow estimation apparatus 100 may generate an overall feature that reflects therein both the features based on the depth feature and the motion feature.

In operation 250, the scene flow estimation apparatus 100 may estimate an optical flow of the input image based on the motion feature. Operation 250 of estimating an optical flow will also be referred to as optical flow estimation. In operation 260, the scene flow estimation apparatus 100 may estimate a depth of the input image based on the overall feature. Operation 260 of estimating a depth will also be referred to as a depth estimation. In operation 270, the scene flow estimation apparatus 100 may estimate a scene flow of the input image based on the overall feature. Operation 270 of estimating a scene flow will also be referred to as a scene flow estimation.

The scene flow estimation apparatus 100 may repeatedly perform operation 250 for the optical flow estimation, operation 260 for the depth estimation, and operation 270 for the scene flow estimation a plurality of times. In an example, the scene flow estimation apparatus 100 may perform operation 250 for the optical flow estimation, operation 260 for the depth estimation, and operation 270 for the scene flow estimation until a resolution of the input image is reached.

In operation 230 of extracting the motion feature, the scene flow estimation apparatus 100 may use a result of the optical flow estimation and a result of the scene flow estimation that are obtained from an immediately previous step. In operation 231, the scene flow estimation apparatus 100 may warp the feature pyramid in a warping layer based on the result of the previous optical flow estimation and the result of the previous scene flow estimation. In operation 233, the scene flow estimation apparatus 100 may calculate a correlation based on the feature pyramid and a result of the warping. In operation 235, after calculating the correlation, the scene flow estimation apparatus 100 may extract a regularized motion feature from a correlation regularization module.

The scene flow estimation apparatus 100 may obtain a final result of the scene flow estimation based on an overall feature obtained by repeatedly performing operation 250 for the optical flow estimation, operation 260 for the depth estimation, and operation 270 for the scene flow estimation until the resolution of the input image is reached.

Figure 3:
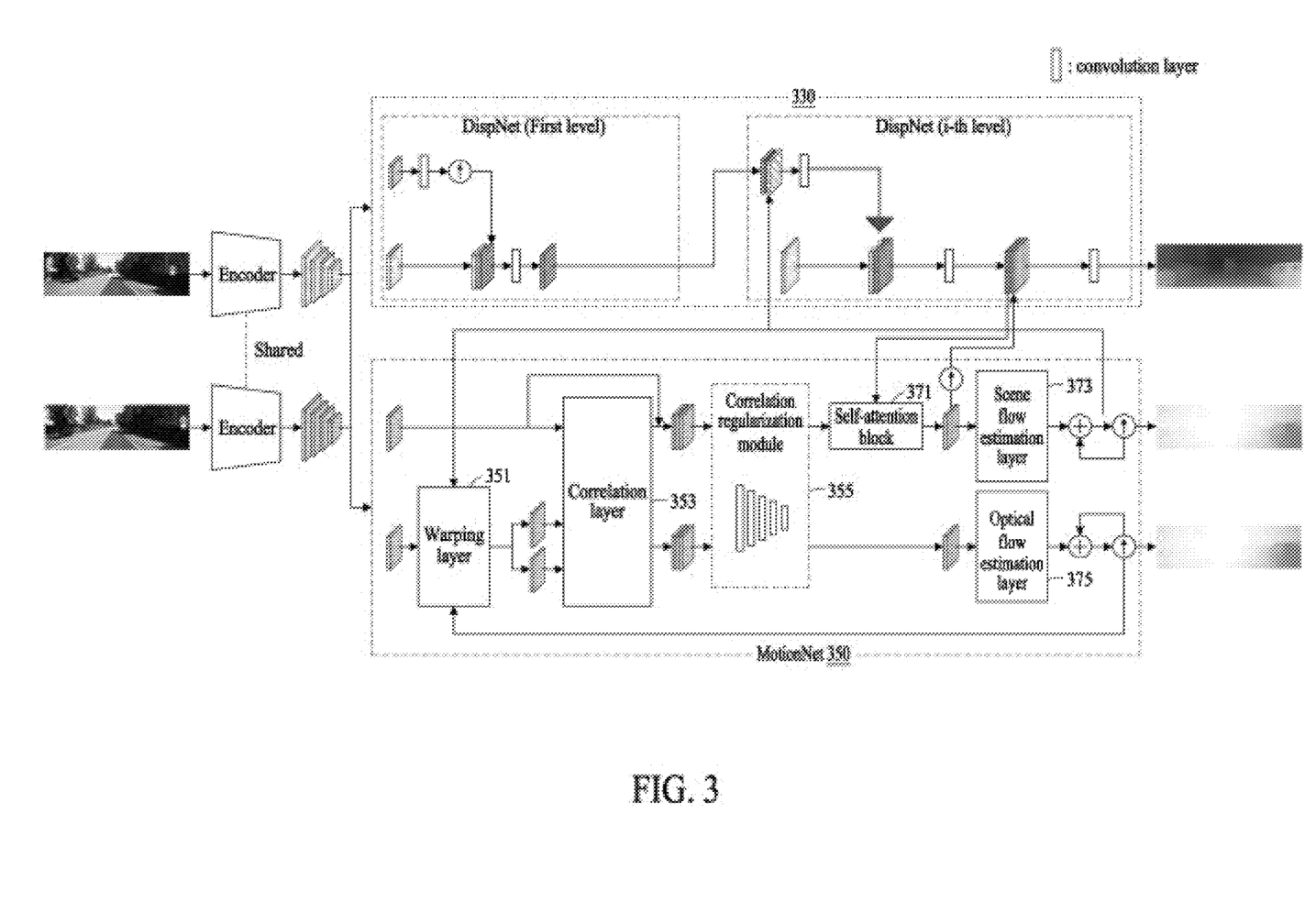
FIG. 3 illustrates an example of an operation of the scene flow estimation apparatus illustrated in FIG. 1.

FIG. 3 illustrates another example of an operation of the example scene flow estimation apparatus 100 illustrated in FIG. 1.

The scene flow estimation apparatus 100 may obtain a first feature pyramid and a second feature pyramid by encoding a first frame and a second frame of an input image through a same encoder 310. In an example, the first frame and the second frame may be temporally consecutive frames of the input image. The first frame may be a previous frame and the second frame may be a current frame.

A feature pyramid implemented herein may include a plurality of levels, and each of the levels may have a different resolution. In an example, the highest level of the feature pyramid may have the same resolution as the input image, and the resolution may decrease as the level decreases.

The scene flow estimation apparatus 100 may perform depth estimation, optical flow estimation, and scene flow estimation through a depth decoder 330 and a motion decoder 350. The encoder 310, the depth decoder 330, and the motion decoder 350 are provided as components conceptually separated based on their operations and may not be construed as physically separate components. Operations of the scene flow estimation apparatus 100 may be construed as being performed by the processor 150 of FIG. 1.

The depth decoder 330 may extract a depth feature based on a feature pyramid and estimate a depth of the input image. In a non-limiting example, the depth decoder 330 may be of a U-Net structure using a skip connection.

The scene flow estimation apparatus 100 may make inputs, to the depth decoder 330, in sequential order from a first level to a final level of the first feature pyramid, and the depth decoder 330 may then estimate a final depth of the input image.

The depth decoder 330 may perform a convolution operation on the first level of the first feature pyramid, upsample a result of the convolution operation, concatenate a result of the upsampling and a second level of the first feature pyramid, and perform a convolution operation on a result of the concatenating. A result of the convolution operation may be used for an operation of the depth decoder 330 to be performed on a next level of a feature pyramid.

The depth decoder 330 may perform depth feature extraction using a previous operation result, starting from a third level of the first feature pyramid. The depth decoder 330 may concatenate the previous operation result and a result of scene flow estimation and perform a convolution operation thereon. The depth decoder 330 may concatenate a result of the convolution operation and a level of the first feature pyramid in a current step and perform a convolution operation thereon to extract the depth feature.

The depth decoder 330 may concatenate the extracted depth feature and an overall feature, perform a convolution operation thereon, and estimate a depth of the input image based on a result of the convolution operation. The overall feature may be generated based on a motion feature extracted from the motion decoder 350 and the depth feature extracted from the depth decoder 330. The depth feature extracted from the depth decoder 330 may be input to the motion decoder 350, and the overall feature may be generated in the motion decoder 350.

The motion decoder 350 may extract the motion feature based on the first feature pyramid and the second feature pyramid. The motion decoder 350 may perform optical flow estimation based on the motion feature.

The motion decoder 350 may generate the overall feature based on the depth feature extracted from the depth decoder 330 and the motion feature extracted from the motion decoder 350, and perform the scene flow estimation based on the overall feature.

The motion decoder 350 may warp a first level of the second feature pyramid through a warping layer 351. The warping layer 351 may warp the first level of the second feature pyramid based on a result of the scene flow estimation and a result of the optical flow estimation that are obtained from an immediately previous step. In an example, the warping layer 351 may generate two warped features by adjusting a position of each pixel included in the first level of the second feature pyramid based on the result of the scene flow estimation and the result of the optical flow estimation.

The motion decoder 350 may input the first level of the first feature pyramid and the warped features to a correlation layer 353. The correlation layer 353 may calculate a correlation of each pixel of the first level of the first feature pyramid with the warped features. In an example, the correlation layer 353 may generate a window of a certain size around each pixel of the first level of the first feature pyramid and calculate a correlation between a pixel and warped feature values corresponding to the window.

The motion decoder 350 may concatenate the first level of the first feature pyramid and an output of the correlation layer 353, and input a result of the concatenating to a correlation regularization module 355. The motion decoder 350 may extract the motion feature as an output of the correlation regularization module 355. In an example, the correlation regularization module 355 may continuously perform a plurality of convolution operations.

The motion decoder 350 may input the motion feature and the depth feature extracted from the depth decoder 330 to a self-attention block 371. The self-attention block 371 may generate the overall feature based on the motion feature and the depth feature. The motion decoder 350 and the depth decoder 330 may share the overall feature, and may thus obtain information needed for the motion feature and the depth feature extracted respectively from the motion decoder 350 and the depth decoder 330.

The motion decoder 350 may input the overall feature to a scene flow estimation layer 373, and obtain a result of the scene flow estimation.

The encoder 310, the depth decoder 330, and the motion decoder 350 implemented by the scene flow estimation apparatus 100 may be trained based on a loss function defined as expressed by Equation 1 below. In Equation 1 below, $\lambda_{xy\text{-}plane}$, $\lambda_{z\text{-}axis}$, $\lambda_{sm\_dp}$, $\lambda_{sm\_sf}$, and $\lambda_{sm\_of}$ denote weights in respective loss functions.

$$L_{total} = L_{dp} + L_{sf} + L_{of} + \lambda_{xy\text{-}plane} L_{xy\text{-}plane} + \lambda_{z\text{-}axis} L_{z\text{-}axis} + \lambda_{sm\_dp} L_{sm\_dp} + \lambda_{sm\_sf} L_{sm\_sf} + \lambda_{sm\_of} L_{sm\_of}.$$ Equation 1

A loss function $L_{dp}$ of depth estimation, a loss function $L_{sf}$ of scene flow estimation, and a loss function $L_{of}$ of optical flow estimation may be calculated as expressed in Equations 2 through 4 below, respectively.

$$L_{dp} = \frac{\sum_p (1 - M^{dp}(p)) \cdot \rho(I_{ref}(p), I^*_{ref}(p + D(p)))}{\sum_q (1 - M^{dp}(q))}$$ Equation 2

$$L_{sf} = \frac{\sum_p (1 - M^{sf}(p)) \cdot \rho(I_{ref}(p), I_{trg}(p + p'_{sf}))}{\sum_q (1 - M^{sf}(q))}$$ Equation 3

$$L_{of} = \frac{\sum_p (1 - M^{of}(p)) \cdot \rho(I_{ref}(p), I_{trg}(p + p'_{of}))}{\sum_q (1 - M^{of}(q))}$$ Equation 4

In Equations 2 through 4, p and q denote pixels included in results of the respective estimations. $I_{ref}$ indicates a reference frame, $I_{trg}$ indicates a target frame, $I^*_{ref}$ indicates opposite stereoscopic frames. $M^{dp}$, $M^{sf}$, and $M^{of}$ indicate occlusion maps of a disparity map, a scene flow map, and an optical flow map, respectively. A similarity function $\rho(\cdot,\cdot)$ may be expressed as in Equation 5 below.

$$\rho(a, b) = \alpha \frac{1 - SSIM(a, b)}{2} + (1 - \alpha)\|a - b\|_1$$ Equation 5

An xy-plane loss function $L_{xy\text{-}plane}$ may be used to determine whether x-axis and y-axis direction motion estimation of the result of the scene flow estimation is accurate. The xy-plane loss function $L_{xy\text{-}plane}$ may be expressed as in Equation 6 below. O and S indicate an estimated optical flow map and scene flow map, respectively.

$$L_{xy\text{-}plane} = \frac{\sum_p (1 - M^{of}(p)) \cdot \|O(p) - S(p)\|_2}{\sum_q (1 - M^{of}(q))}$$ Equation 6

A z-axis loss function $L_{xy\text{-}axis}$ may be used to determine z-axis direction motion estimation of the scene flow estimation by matching three-dimensional (3D) points derived based on the optical flow map and the scene flow map. A 3D point $P_{of}$ based on the optical flow estimation may be obtained by adding O(p) to a pixel p and performing unprojection based on a disparity value $D_{trg}(p')$. The 3D point $P_{of}$ based on the optical flow estimation may be matched with a 3D point $P_{sf}$ based on the scene flow estimation.

$$L_{z\text{-}axis} = \frac{\sum_p (1 - M^{of}(p)) \cdot (1 - M^{dp}(p)) \cdot \|P_{of} - P_{sf}\|_2}{\sum_q (1 - M^{of}(q)) \cdot (1 - M^{dp}(q))}$$ Equation 7 where $$P_{of} = D(p + O(p)) \cdot K^{-1}(p + O(p)),$$

$$P_{sf} = D(p) \cdot K^{-1} p + S(p),$$

Figure 4:
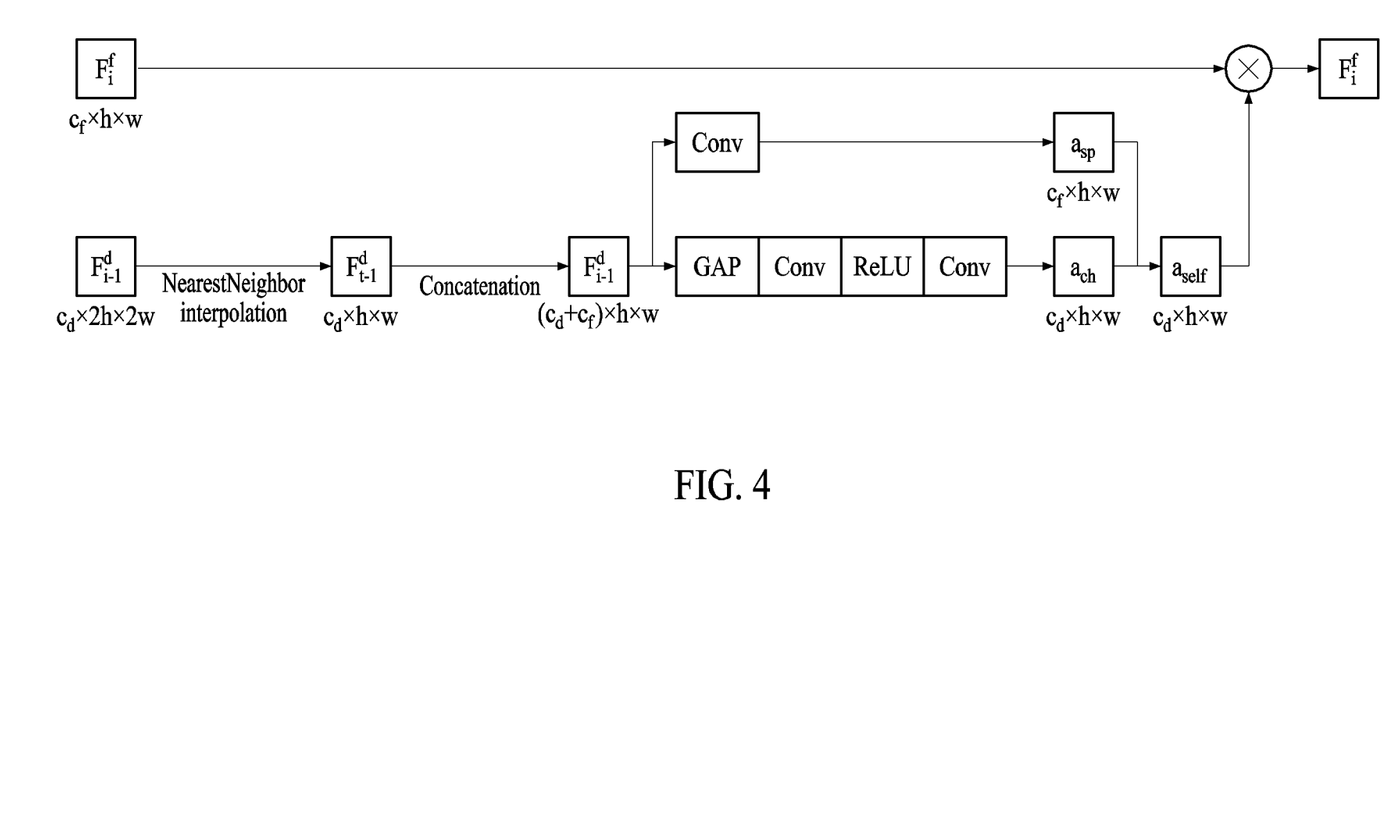
FIG. 4 illustrates an example of an operation of a self-attention block, in accordance with one or more embodiments.

FIG. 4 illustrates an example of an operation of a self-attention block, in accordance with one or more embodiments.

The self-attention block 371 of FIG. 3 may generate an overall feature $\tilde{F}_i^f$ based on a depth feature $F_{i-1}^d$ and a motion feature $F_i^f$. The depth feature $F_{i-1}^d$ may be a depth feature that is extracted through the depth decoder 330 in an immediately previous step. A size of the depth feature $F_{i-1}^d$ may be $c_d * 2h * hw$ and a size of the motion feature $F_i^f$ may be $c_f * h * w$.

The self-attention block 371 may perform a nearest-neighbor interpolation (NNI) on the depth feature $F_{i-1}^d$ and concatenate a result $\tilde{F}_{i-1}^d$ of the NNI and the motion feature $F_i^f$. A size of a result $F_i^{f,d}$ of the concatenating may be $(c_d + c_f) * h * w$.

The self-attention block 371 may extract a spatial feature $\alpha_{sp}$ and a channel feature $\alpha_{ch}$ based on the concatenated result $F_i^{f,d}$. The spatial feature $\alpha_{sp}$ may be obtained by performing a convolution operation on the concatenated result $F_i^{f,d}$, and the channel feature $\alpha_{ch}$ may be obtained by sequentially performing a global average pooling (GAP) operation, a convolution operation, a rectified linear unit (ReLU) operation, and a convolution operation on the concatenated result $F_i^{f,d}$.

The self-attention block 371 may multiply a corresponding channel of the spatial feature $\alpha_{sp}$ by a value in each channel of the channel feature $\alpha_{ch}$. The self-attention block 371 may multiply the motion feature $F_i^f$ by a result $\alpha_{self}$ of the multiplying to derive the overall feature $\tilde{F}_i^f$.

Figure 5:
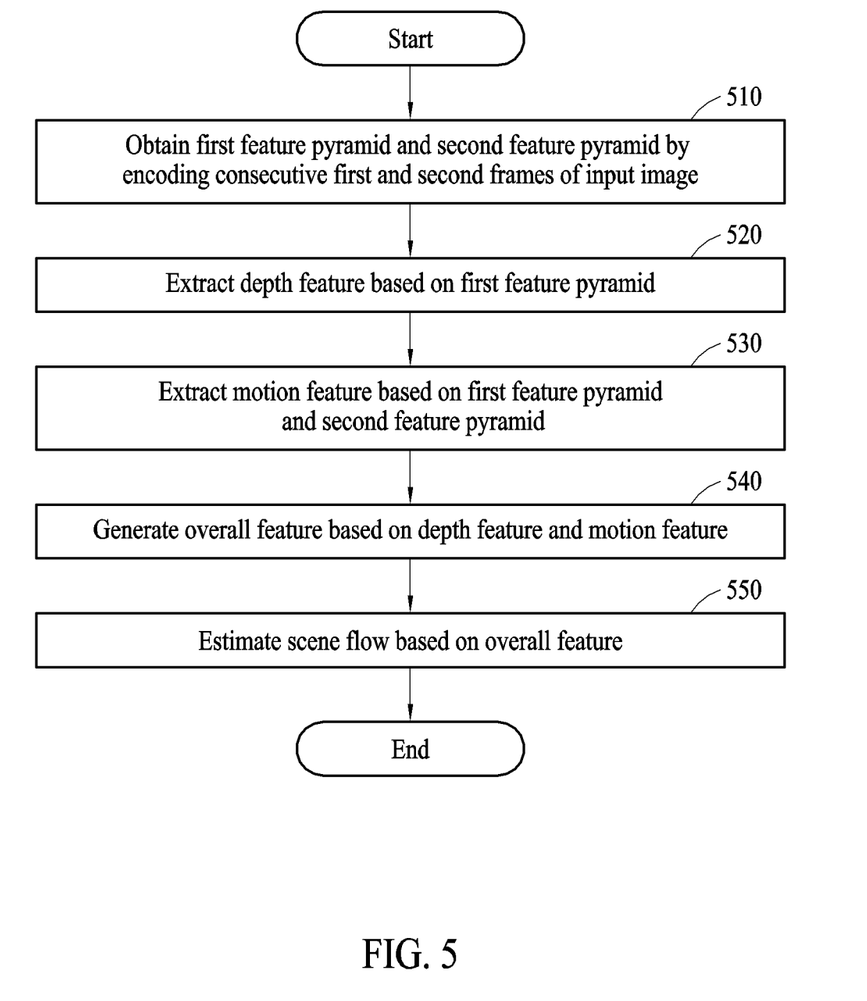
FIG. 5 illustrates an example of a scene flow estimation method, in accordance with one or more embodiments.

FIG. 5 illustrates an example of a scene flow estimation method, in accordance with one or more embodiments.

The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently.

In operation 510, a scene flow estimation apparatus may obtain a first feature pyramid and a second feature pyramid by encoding a first frame and a second frame of an input image through the same encoder.

In operation 520, the scene flow estimation apparatus may extract a depth feature based on the first feature pyramid. The scene flow estimation apparatus may extract the depth feature by performing decoding on a first level and a second level of the first feature pyramid and performing decoding on a third level of the first feature pyramid based on a result of the decoding.

In an example, the scene flow estimation apparatus may extract the depth feature by performing a first convolution operation on the first level, upsampling a result of the first convolution operation and concatenating a result of the upsampling and the second level, performing a second convolution operation on a result of the concatenating, concatenating the result of the decoding and a result of scene flow estimation performed in an immediately previous step, and performing a third convolution operation on a result of the concatenating, upsampling a result of the third convolution operation and concatenating a result of the upsampling and the third level, performing a fourth convolution operation on a result of the concatenating, concatenating a result of the fourth convolution operation and an overall feature and performing a fifth convolution operation.

In operation 530, the scene flow estimation apparatus may extract a motion feature based on the first feature pyramid and the second feature pyramid. The scene flow estimation apparatus may extract the motion feature by inputting a first level of the second feature pyramid to a warping layer and inputting an output of the warping layer and the first level of the first feature pyramid to a correlation layer, concatenating an output of the correlation layer and the first level of the first feature pyramid, and inputting a result of the concatenating to a correlation regularization module configured to perform a plurality of convolution operations. The warping layer may adjust a position of each pixel of the first level of the second feature pyramid based on a result of optical flow estimation that is based on the motion feature in an immediately previous step and on a result of scene flow estimation that is based on the overall feature in an immediately previous step. The correlation layer may calculate a correlation of each pixel of the first level of the first feature pyramid with the output of the warping layer.

In operation 540, the scene flow estimation apparatus may generate the overall feature based on the depth feature and the motion feature. The scene flow estimation apparatus may perform a nearest-neighbor interpolation (NNI) on the depth feature and concatenate a result of the NNI and the motion feature, perform a convolution operation based on a concatenated feature obtained by the concatenating, and extract a spatial feature therefrom, perform a global average pooling (GAP) operation on the concatenated feature and extract a channel feature therefrom, and obtain the overall feature based on the spatial feature, the channel feature, and the motion feature.

In operation 550, the scene flow estimation apparatus may estimate a scene flow based on the overall feature. The scene flow estimation apparatus may estimate a depth of an input image based on the depth feature. The scene flow estimation apparatus may estimate an optical flow of the input image based on the motion feature.

For operations or steps not described with reference to FIG. 5, reference may be made to the operations or steps described above with reference to FIGS. 1 through 4.

The scene flow estimation apparatus, the processor 150, the memory 130, the capturing apparatus 170, and other apparatuses, devices, units, modules, and components described herein with respect to FIGS. 1 to 5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random-access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented scene flow estimation method, comprising:
   receiving a first feature pyramid and a second feature pyramid by encoding a first frame and a second frame of an input image through a same encoder;
   extracting a depth feature based on the received first feature pyramid;
   extracting a motion feature based on the received first feature pyramid and the received second feature pyramid;
   generating an overall feature based on the depth feature and the motion feature; and
   estimating a scene flow based on the overall feature,
   wherein the extracting of the motion feature comprises:
      inputting a first level of the second feature pyramid to a warping layer;
      inputting an output of the warping layer and a first level of the first feature pyramid to a correlation layer; and
      concatenating an output of the correlation layer and the first level of the first feature pyramid and inputting a result of the concatenating to a correlation regularization module configured to perform a plurality of convolution operations,
   wherein the warping layer is configured to adjust a position of each pixel of the first level of the second feature pyramid based on a result of a previous optical flow estimation performed based on the motion feature, and a result of a previous scene flow estimation performed based on the overall feature.

2. The method of claim 1, further comprising:
   estimating a depth of the input image based on the depth feature; and
   estimating an optical flow of the input image based on the motion feature.

3. The method of claim 2, wherein the extracting of the depth feature comprises:
   performing decoding on a first level and a second level of the first feature pyramid; and
   performing decoding on a third level of the first feature pyramid based on a result of the decoding on the first level and the second level of the first feature pyramid.

4. The method of claim 3, wherein the performing of the decoding on the first level and the decoding on the second level comprises:
   performing a first convolution operation on the first level;
   upsampling a result of the first convolution operation, and concatenating a result of the upsampling and the second level; and
   performing a second convolution operation on a result of the concatenating.

5. The method of claim 4, wherein the performing of the decoding on the third level comprises:
   concatenating the result of the decoding on the third level and a result of a previous scene flow estimation and performing a third convolution operation on a result of the concatenating;
   upsampling a result of the third convolution operation and concatenating a result of the upsampling and the third level;

performing a fourth convolution operation on a result of the concatenating; and concatenating a result of the fourth convolution operation and the overall feature and performing a fifth convolution operation on a result of the concatenating.

6. The method of claim 1, wherein the correlation layer is configured to calculate a correlation of each pixel of the first level of the first feature pyramid with the output of the warping layer.

7. The method of claim 1, wherein the generating of the overall feature comprises:

performing a nearest-neighbor interpolation (NNI) on the depth feature and concatenating a result of the NNI and the motion feature;

performing a convolution operation based on a concatenated feature obtained by the concatenating and extracting a spatial feature;

performing a global average pooling (GAP) operation on the concatenated feature and extracting a channel feature; and obtaining the overall feature based on the spatial feature, the channel feature, and the motion feature.

8. A non-transitory computer-readable storage medium storing instructions that, when executed by a processor, cause the processor to perform the scene flow estimation method of claim 1.

9. A scene flow estimation apparatus, comprising:

a memory comprising instructions; and one or more processors configured to execute the instructions, wherein, when the instructions are executed by the one or more processors, the one or more processors are configured to:

receive a first feature pyramid and a second feature pyramid by encoding a first frame and a second frame of an input image through a same encoder;

extract a depth feature based on the received first feature pyramid;

extract a motion feature based on the received first feature pyramid and the received second feature pyramid;

generate an overall feature based on the depth feature and the motion feature; and estimate a scene flow based on the overall feature, wherein the one or more processors are further configured to:

input a first level of the second feature pyramid to a warping layer;

input an output of the warping layer and a first level of the first feature pyramid to a correlation layer; and concatenate an output of the correlation layer and the first level of the first feature pyramid, and input a result of the concatenating to a correlation regularization module configured to perform a plurality of convolution operations, wherein the warping layer is configured to adjust a position of each pixel of the first level of the second feature pyramid based on a result of a previous optical flow estimation performed based on the motion feature and a result of a previous scene flow estimation performed based on the overall feature.

10. The apparatus of claim 9, wherein the one or more processors are further configured to:

estimate a depth of the input image based on the depth feature; and estimate an optical flow of the input image based on the motion feature.

11. The apparatus of claim 10, wherein the one or more processors are further configured to:

perform decoding on a first level and a second level of the first feature pyramid; and perform decoding on a third level of the first feature pyramid based on a result of the decoding on the first level and the second level of the first feature pyramid.

12. The apparatus of claim 11, wherein the one or more processors are further configured to:

perform a first convolution operation on the first level;

upsample a result of the first convolution operation and concatenate a result of the upsampling and the second level; and perform a second convolution operation on a result of the concatenating.

13. The apparatus of claim 12, wherein the one or more processors are further configured to:

concatenate the result of the decoding on the third level and a result of a previous scene flow estimation and perform a third convolution operation on a result of the concatenating;

upsample a result of the third convolution operation and concatenate a result of the upsampling and the third level;

perform a fourth convolution operation on a result of the concatenating; and concatenate a result of the fourth convolution operation and the overall feature and perform a fifth convolution operation on a result of the concatenating.

14. The apparatus of claim 9, wherein the correlation layer is configured to calculate a correlation of each pixel of the first level of the first feature pyramid with the output of the warping layer.

15. The apparatus of claim 9, wherein the one or more processors are further configured to:

perform a nearest-neighbor interpolation (NNI) on the depth feature and concatenate a result of the NNI and the motion feature;

perform a convolution operation based on a concatenated feature obtained by the concatenating and extract a spatial feature;

perform a global average pooling (GAP) operation on the concatenated feature and extract a channel feature; and obtain the overall feature based on the spatial feature, the channel feature, and the motion feature.

16. A scene flow estimation system, comprising:

a capturing apparatus configured to capture a monocular image; and the scene flow estimation apparatus of claim 9.

* * * * *